Figure 4:
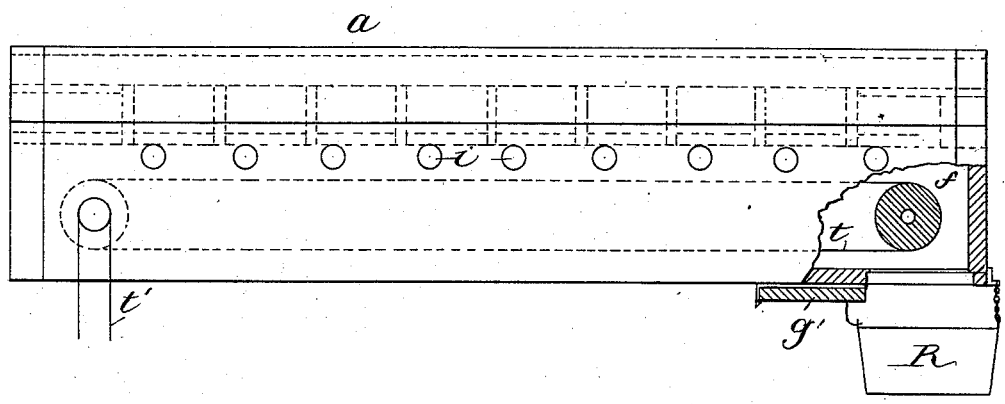

(No Model.) 2 Sheets—Sheet 1.
B. ROBINSON.
DUST TRUNK FOR COTTON CLEANING.
No. 351,715. Patented Oct. 26, 1886.
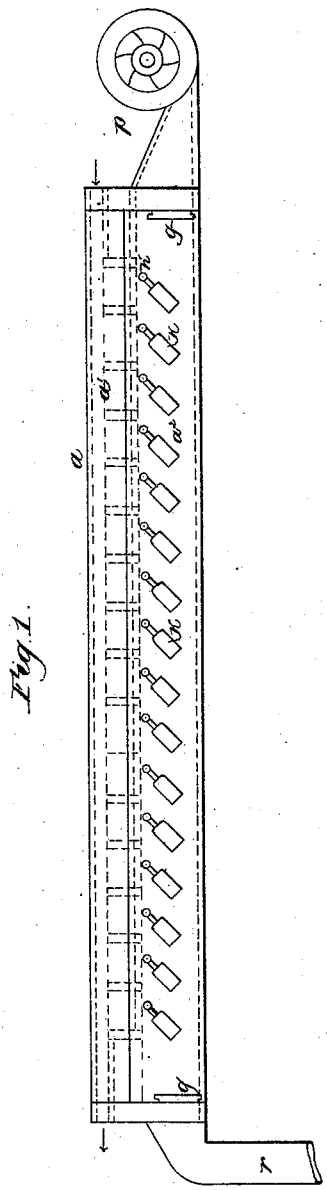
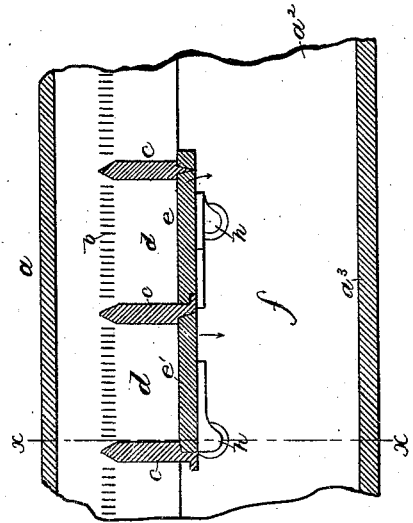
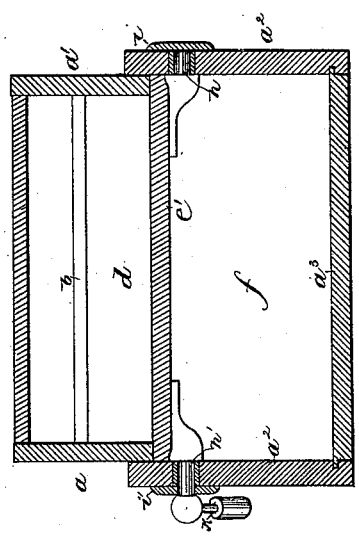
Witnesses
Jas. J. Maloney
Chas. A. Whitney
Inventor,
Benj. Robinson,
by Jos. P. Livermore
Atty.

(No Model.)

B. ROBINSON.
DUST TRUNK FOR COTTON CLEANING.

No. 351,715. Patented Oct. 26, 1886.

Witnesses,
Jas. J. Maloney
H. P. Bates.

Inventor,
Benj. Robinson,
by Jos. P. Livermore
Att'y.

UNITED STATES PATENT OFFICE.

BENJAMIN ROBINSON, OF LOWELL, MASSACHUSETTS, ASSIGNOR OF ONE-HALF TO STEPHEN N. BOURNE, OF MANCHESTER, NEW HAMPSHIRE.

DUST-TRUNK FOR COTTON-CLEANING.

SPECIFICATION forming part of Letters Patent No. 351,715, dated October 26, 1886.

Application filed May 7, 1886. Serial No. 201,463. (No model.)

*To all whom it may concern:*

Be it known that I, BENJAMIN ROBINSON, of Lowell, county of Middlesex, State of Massachusetts, have invented an Improvement in Dust-Trunks for Cotton-Cleaning, of which the following description, in connection with the accompanying drawings, is a specification, like letters on the drawings representing like parts.

My invention relates to a cotton-cleaning apparatus of that class in which the loose pieces of cotton are drawn by a current of air through a trunk or tube over a grating having dust-receptacles beneath it, the loose dust being shaken from the cotton in its passage, and, owing to its greater specific gravity, dropping through the grating into the dust-receptacles below. The dust-receptacles have to be as nearly as possible air-tight in order to prevent the air from passing upward through the grating into the pipe or trunk through which the cotton is being drawn, and as heretofore made each dust-receptacle has had a tight-fitting removable bottom, which is taken out, when the trunk is not in operation, for the purpose of removing the dust that has accumulated in the receptacle.

The object of my invention is to facilitate the removal of dust from the receptacles.

The invention consists, essentially, in a cotton-cleaning apparatus composed of the usual cleaning-trunk or air-pipe, through which the cotton is conveyed, and grated or perforated bottom for said air-pipe, and separate dust-receptacles below the said grating, and a permanent dirt-receiving chamber below the said dust-receptacles, and movable bottoms for the latter, provided with actuating mechanism that can be operated from the outside of the trunk, whereby the dust may be permitted to fall from the dust-receptacles below the grating into the receiving-chamber or passage below the dust-receptacles, from which it may be carried away by a current of air, or by an endless belt or other suitable discharging appliances. The chamber or passage below the dust-receptacles is preferably substantially air-tight, and is preferably provided with valves or gates near its ends, by which it may be wholly cut off from the external air, so that the bottom of a dust-receptacle may be opened to discharge the dust into the receiving-chamber below without permitting the air to pass upward through the said dust-receptacle into the trunk through which the cotton passes, and by closing the chamber below the dust-receptacles while the apparatus is in operation there will be less leakage of air through the dust-receptacles into the cotton trunk than when the said dust-receptacles open directly into the surrounding air, as is usually practiced.

Figure 1 is a side elevation of a portion of a cotton-cleaning trunk embodying this invention; Fig. 2, a transverse section thereof on a larger scale; Fig. 3, a longitudinal section of a portion of a trunk on the same scale as Fig. 2; and Fig. 4, a side elevation, partly in section, of a cotton-cleaning trunk, showing a modification of the means for removing the dirt from the dirt-receiving chamber below the dust-receptacle.

The trunk consists, essentially, of a long box or tube having its top, bottom, and sides as nearly air-tight as possible, and having a short distance below its top a grating, $b$, (best shown in Fig. 3,) below which are a series of transverse vertical partitions, $c$, forming a series of separate dust-receptacles, $d$, closed at their under side by movable bottoms $e$, which shut as nearly air-tight as possible against the lower ends of the partition $c$. This construction affords a practically air-tight tube between the top $a$, the sides $a'$, Fig. 2, and the grating $b$, through which tube the tufts of cotton may be drawn by a current of air produced by exhausting the air from one end of the trunk by suitable appliances in the usual manner, and the receptacles $d$ contain dead-air, as the partitions $c$ prevent the current of air from passing lengthwise of the trunk below the grating $b$. The dust or dirt, which is heavier than the cotton, is thus shaken from the cotton as it passes along over the grating and drops through the grating into the dust-receptacles $d$ below.

Dust-trunks as now generally made and used have the bottom pieces of each of the dust-receptacles separately removable and opening directly into the air, they forming when in place the bottom of the trunk; and as it is impracticable to fit the covers absolutely air-tight, it is customary to empty about one-third of the receptacles at a time, leaving the dust in the others to form a packing around the joints of the covers or bottom piece, so that the leakage will only occur in the dust-receptacles that have last been emptied, and after a sufficient amount of dust has collected in those last emptied to pack the joints the operation of the trunk is again stopped and another set emptied, and so on.

In accordance with the present invention the sides $a'$ of the trunk are extended below the dust-receptacles, as shown at $a^2$, and provided with a bottom, $a^3$, which may have a practically air-tight joint therewith, as it does not have to be removed in the operation of the apparatus, so that another practically air-tight chamber or tube, $f$, is formed below the dust-receptacles, which tube may be provided with gates $g$, as shown at Fig. 1, at its ends, so as to make it practically air-tight, and thus prevent the passage of air into the dust-receptacles $d$, even if the bottom of the latter did not fit with perfect tightness, and the bottoms $e$ may be opened to permit the dust to fall from the receptacles $d$ into the trunk or passage $f$ without producing any flow of air upward through the dust-receptacles into the main passage $b$.

The bottoms $e$ are each shown as pivoted on journals $h\,h'$, working in bearing-pieces $i\,i'$, the former, $i$, having a cap which closes the joint or bearing in the side $a^2$ of the trunk with perfect tightness, while the journal $h'$ at the other end extends with a close fit through the bearing $i'$, and is provided with an operating-lever, $k$, by which it may be turned to swing the bottom $e$ from a horizontal to a vertical position inside the trunk, for the purpose of emptying the receptacle. The operating-levers $k$ are weighted and have a tendency to retain the bottom pieces, $e$, in their horizontal or closed position.

Two slightly-modified constructions of the bottom pieces, $e$, are illustrated in Fig. 3, the one $e'$ being pivoted near one edge, so that the entire cover swings down bodily below the dust-receptacle, and the one $e$ being pivoted at an intermediate point, so that a part turns upward into the dust-receptacle, while the part on the opposite side of the journal turns downward into the chamber or tube $f$, this latter construction being adopted when it is desired to economize vertical space in the trunk.

In both constructions the covers fit with a rabbeted joint all around the sides of the dust-receptacles, thus insuring great tightness or resistance to the passage of air. By having the chamber $f$ tightly closed at its ends by means of the gates $g$, the dust-receptacles may all be emptied at one time without permitting too great leakage of air upward through the dust-receptacles when the trunk is next set in operation, as would be the case if the bottoms $e$ opened directly into the air, instead of into a substantially air-tight chamber, and after the dust has been discharged from any or all of the receptacles into the chamber $f$, and the bottoms of the dust-receptacles closed and packed by a partial accumulation of dust within them, the gates $g$ at the end of the chamber $f$ may be opened and a blast of air forced through the said chamber $f$ by a suitable air-forcing apparatus or blower, such as shown at $p$, Fig. 1, to drive the dust out and discharge it through a delivery pipe or duct, $r$, leading to any desired point; or, if preferred, the chamber $f$ may contain an endless apron or belt, as represented at $t$, Fig. 4, said belt being actuated at the proper times by a belt, $t'$, passing over a pulley on the shaft of one of the drums supporting the said belt; or the chamber $f$ may be provided with any suitable conveying apparatus, forming a means for discharging the contents of the said chamber. When an endless apron is used, as represented in Fig. 4, the opening through which the dirt is discharged may be provided with a gate or door, $g'$, at the under side of the receiving-chamber, and when the dirt is to be removed the said door may be opened and a suitable receptacle, R, placed beneath to receive the dirt as it falls from the belt or apron $t$.

By having a permanent dirt-receiving chamber extending below the dust-receptacles, as herein described, the trunk may be conveniently carried along the top of the room or apartment of a mill without danger of injury to apparatus below, thus enabling machinery to be arranged in space below the trunk which could not be utilized with trunks of common construction.

I claim—

1. A trunk for cleaning cotton or analogous operation, consisting of a passage for the material to be cleaned, having a grating at its bottom, a series of separate dust-receptacles below the said grating, and movable bottoms for said dust-receptacles, and a dirt-receiving chamber below said dust-receptacles, substantially as described.

2. A trunk for cleaning cotton or analogous operation, consisting of a passage for the material to be cleaned, having a grating at its bottom, a series of separate dust-receptacles below the said grating and movable bottoms for said dust-receptacles, and a dirt-receiving chamber below said dust-receptacles, and actuating devices outside of the trunk for the bottoms of the dust-receptacles, substantially as described.

3. A trunk for cleaning cotton or analogous operation, consisting of a passage for the material to be cleaned, having a grating at its bottom, a series of separate dust-receptacles below the said grating and movable bottoms for said dust-receptacles, and a tight chamber below the said dust-receptacles, the said lower chamber forming a continuous passage below the dust-receptacles, and gates for closing the ends of the said passage or chamber, substantially as described.

In testimony whereof I have signed my name to this specification in the presence of two subscribing witnesses.

BENJAMIN ROBINSON.

Witnesses:
JAMES N. BOURNE,
M. CARRIE K. BOURNE.